United States Patent [19]

Hughes et al.

[11] Patent Number: 5,315,089

[45] Date of Patent: May 24, 1994

[54] SYSTEM AND METHOD FOR CONVERTING AN AGTAW WELDER INTO AN AGMAW WELDER

[75] Inventors: Travis K. Hughes, Madison, Ohio; Glenn W. Campbell, Green Oak, Ill.; Charles E. Burgoon; John B. Gossett, both of Kenosha, Wis.; Keith R. Spencer, West Miltmore, Ill.

[73] Assignee: Westinghouse Electric Corporation, Pittsburgh, Pa.

[21] Appl. No.: 844,052

[22] Filed: Mar. 2, 1992

[51] Int. Cl.$^5$ .............................................. B23K 9/09
[52] U.S. Cl. ........................... 219/137 PS; 219/130.51
[58] Field of Search ...................... 219/137 PS, 130.51

[56] References Cited

U.S. PATENT DOCUMENTS

| | | |
|---|---|---|
| 4,410,788 | 10/1983 | Summers et al. |
| 4,475,028 | 10/1984 | McGuire, Jr. et al. |
| 4,507,543 | 3/1985 | Ukai et al. ................. 219/130.51 |
| 4,570,050 | 2/1986 | Veal et al. |
| 4,716,274 | 12/1987 | Gilliland |
| 4,868,366 | 9/1989 | Joseph et al. |

*Primary Examiner*—Clifford C. Shaw

[57] ABSTRACT

Both a system and a method for converting two AGTAW welders into a AGMAW welder is provided. The system generally comprises a MIG weldhead for replacing the TIG weldhead of one of the AGTAW welders, a pulser multiplier circuit for increasing the frequency of the power supply output current from 10 to between 300 and 800 pulses per second, and a wire feed motor and motor control circuit capable of feeding weld wire at a rate compatible with a AGMAW welding operation. In the method of the invention, the control circuit assembly of one of the AGTAW welders is connected in parallel to the power supplies of both of the two AGTAW welders, and the outputs of these power supplies are likewise connected in parallel. The TIG weldhead of one of the AGTAW welders is replaced with the MIG weldhead, and the pulser multiplier circuit is selectively connected to the current pulser of the single control circuit assembly which controls both power supplies. Next, the existing wire feed motor and motor control circuit of one of the AGTAW welders is replaced with the high-feed rate motor and control circuit of the system. Finally, the upslope and downslope circuit and the arc voltage response circuit which are normally present in the programmer of the control circuit assembly of one of the AGTAW welders is converted into a AGMAW burnback circuit in order to prevent weld wire from the wire feeder from fusing into the weld puddle.

25 Claims, 6 Drawing Sheets

SYSTEM AND METHOD FOR CONVERTING AN AGTAW WELDER INTO AN AGMAW WELDER

BACKGROUND OF THE INVENTION

This invention relates to both a system and a method for converting an AGTAW welder into an AGMAW welder.

Many companies having a need for performing welding operations have invested in automatic tungsten inert gas welders known in the art as AGTAW welding systems. However, as will be set forth in more detail hereinafter, such AGTAW welders are limited in the amount of metal they can deposit, and hence are too slow to effectively implement certain kinds of welds requiring large amounts of metal deposition. AGMAW (automatic gas metal arc) welding systems are also known in the prior art that are capable of depositing metal at rates an order of magnitude faster than AGTAW welders. Unfortunately, it is frequently not cost-effective for a company to own both an AGTAW and an AGMAW system as there is a much less frequent need for the high deposition welds that the latter can implement. Accordingly, the principal purpose of this invention is to provide a method for easily and temporarily converting an AGTAW welder into a AGMAW welder. But to fully appreciate the utility of the invention, some background as to the structure of AGTAW and AGMAW welders is necessary.

AGTAW welders typically comprise a weldhead including a tungsten electrode which is automatically movable around a workpiece by means of one or more servomotors, a power supply for supplying up to 300 amps of current to the tungsten electrode in the weldhead, a water cooling system for circulating water through the weldhead in order to cool it during a welding operation, and a control circuit assembly including a programmer for controlling the electrical characteristics of the output of the power supply connected to the tungsten electrode. Such AGTAW welders further include a source of inert gas connected to the weldhead for displacing corrosive atmospheric oxygen away from the molten puddle created during a welding operation, as well as a feeding mechanism for feeding weld wire to the working end of the tungsten electrode. The wire feeding mechanism in turn includes a motor for driving the wire at a selected speed (which may be as high as 100 inches per minute), and a motor control circuit which receives commands from the control circuit assembly of the welder.

While the control circuit assembly coordinates the various servomotors which move the weldhead and feed the weld wire to the working end of the tungsten electrode, its most important function for the purposes of this application is to control of the electrical characteristics of the output of the power supply.

Generally speaking, such control circuit assemblies regulate the output of a power supply by maintaining the current of the output at a desired level, while allowing the voltage to vary. To effect such current level control, the output of the power supply includes a shunt resistor across which are the connected the leads of an ammeter which forms part of the control circuit assembly. While the shunt resistor is characterized by a low level of resistance to minimize its interference with the output of the power supply, the voltage drop across it, which is typically only one millivolt per 100 amps, is still readily measurable by the ammeter of the control circuit assembly. In operation, the combination of the shunt resistor and the ammeter form a closed feedback loop which cooperates with various switching transistors in the control circuit assembly to maintain the amperage of the output of the power supply at a level which is set by a thumbwheel switch located in the programmer.

To control the characteristics of the current output, the control circuit assembly further includes a current pulser for pulsing the output current between a relatively low "background" current and a relatively higher "working" current. In a typical AGTAW welding operation, the background current may be 90 amps, while the working current might be 180 amps. The switching frequency between the background and working currents may be adjusted by the programmer to a maximum frequency of about ten cycles per second. The periodic use of a low background current between pulses of a working current maintains the molten puddle created by the electric arc in a semi-solid condition so that molten metal will not flow out of the situs of the weld from gravity if the weld site is tilted or inverted.

Finally, the programmer of a control circuit assembly of a typical AGTAW welder includes an upslope and downslope circuit for linearly ramping the current level of the arc over a time period which is typically between about four and ten seconds. In addition to helping the operator of the welder "get started" in producing the desired weld, the downsloping characteristics of this circuit prevent cracks from occurring in the molten puddle at the termination of the welding operation by shutting off the current in a gradual (as opposed to abrupt) manner.

In contrast to AGTAW welders, AGMAW welders use the weld wire itself as the electrode in the weldhead. Such direct melting of the weld wire itself, in combination with the higher outputs associated with AGMAW power supplies, allows AGMAW welders to deposit far more metal in a shorter period of time than AGTAW welders. While a AGTAW welder may be able to deposit 100 inches of weld wire per minute, a AGMAW welder is capable of depositing up to 1,000 inches of such weld wire per minute. Because most industrial welding operations do not require such quick and large depositions of metal, AGTAW welders are far more common in the industrial marketplace than AGMAW welders. This fact, coupled with the need for higher capacity (and hence more costly) power supplies in AGMAW welders, renders AGMAW welders substantially more expensive than AGTAW welders. Yet there are some welding operations which, in order to be performed in a practical and cost efficient way, necessarily require the high deposition rate which can only be achieved with a AGMAW welder. While combined AGTAW/AGMAW welders are known in the prior art, such welders are at least as costly as AGMAW welders since they incorporate all of the components of an ordinary AGMAW welder. While it has been proposed to avoid the high cost of purchasing commercially available AGMAW welders by modifying an existing AGTAW welder so that it has AGMAW capabilities, thus far there has been no known way to effect such a conversion easily, inexpensively, and reversibly so that the AGTAW capabilities of the welder may be reclaimed. The difficulties of converting a AGTAW welder into a AGMAW welder go far beyond the provision of a higher capacity power supply and a faster wire feed motor. For example, to accommodate the high rate of weld wire deposition, the current pulser of a AGMAW welder must be capable of operating at frequencies of up to 900 cycles per second which is much higher than the 9.9 cycles per second capacity of AGTAW welder current pulsers. Additionally, n order to prevent the weld wire from being frozen in the weld puddle at the termination of the welding operation, a burnback circuit must be provided that burns the weld wire back from the puddle at this juncture.

Clearly there is a need for a welding system which is capable of inexpensively and easily converting readily available and low-cost AGTAW welders into AGMAW welders. Ideally, such a system would allow the converted AGMAW welder to be converted back into a AGTAW welder so that the AGTAW capabilities of the welder are not lost.

SUMMARY OF THE INVENTION

The invention is both a system and method for temporarily converting a AGTAW welder into a AGMAW welder that overcomes the shortcomings associated with prior art AGTAW/AGMAW welding systems. The invention is applicable to AGTAW welders of the type including a power supply having an output, a TIG weldhead connected to the output of the power supply, a constant current type control circuit assembly including a programmer and having a current pulser for pulsing the power supply output current at a frequency of up to 9.9 times per second, as well as an upslope and downslope circuit for starting and ending a AGTAW welding operation, and an arc voltage response circuit for extending and retracting the tungsten electrode toward and away from the work in order to maintain the weld arc at a constant voltage. The system of the invention generally comprises a AGMAW weldhead for replacing the AGTAW weldhead of one of the AGTAW welders, a pulser multiplier circuit selectively connectable to the current pulser of the control circuit assembly of one of the AGTAW welders for increasing the frequency of the power supply output current to at least 200 pulses per second, and more preferably to between 300 and 800 pulses per second, and a wire feed control circuit and motor capable of feeding weld wire at a rate compatible with a AGMAW welding operation.

In the method of the invention, the control circuit assembly of one of the two AGTAW welders is connected in parallel to the other of the AGTAW welders, such that a single control circuit assembly controls the output of the power supplies of both of the welders. To this end, the shunt resistors used to monitor the current at the output of each of the power supplies of the two AGTAW welders may be connected in parallel. Next, the polarity of the combined output of the two power supplies is reversed so that the electrode in the AGMAW weldhead has a positive polarity. In the next step of the method, the pulser multiplier circuit is connected to the current pulser of the single control circuit assembly which controls both power supplies so that the frequency of the combined power supply output current may be increased to a level compatible with a AGMAW welding operation, (i.e., between 300 and 800 pulses per second). Both the motor and the motor control circuit of the first AGTAW welder is then replaced with a new motor and control circuit which is capable of feeding weld wire at a rate compatible with a AGMAW welding operation (i.e., up to 1,000 inches of weld wire per second). Finally, a burnback circuit is provided for preventing the weld wire from being fused into the weld puddle at the termination of the AGMAW welding operation. In the preferred method, this burnback circuit is provided by modifying the upslope and downslope circuit present in the programmer of the control circuit assembly of the AGTAW welder such that the downslope rate is usable for AGMAW burnback. Such a modification may be advantageously implemented by changing the input voltage of the upslope and downslope circuit by means of one or more resistors present in the arc voltage response circuit present in the programmer of the control circuit assembly of the AGTAW welder.

Hence, the system and method of the invention allows a AGMAW welder of a high amperage capacity to be formed from a AGTAW welder with the addition of only a minimum amount of new components in a minimum amount of conversion steps and with minimal costs. Additionally, the resulting AGMAW welder has a longer service life than prior art AGMAW welders utilizing serially connected power supplies due to the fact that the parallel control of two separate power supplies imposes uniform loads and hence uniform wear on the components of both of the power supplies.

DETAILED DESCRIPTION OF THE PREFERRED EMBODIMENT

Figure 1:
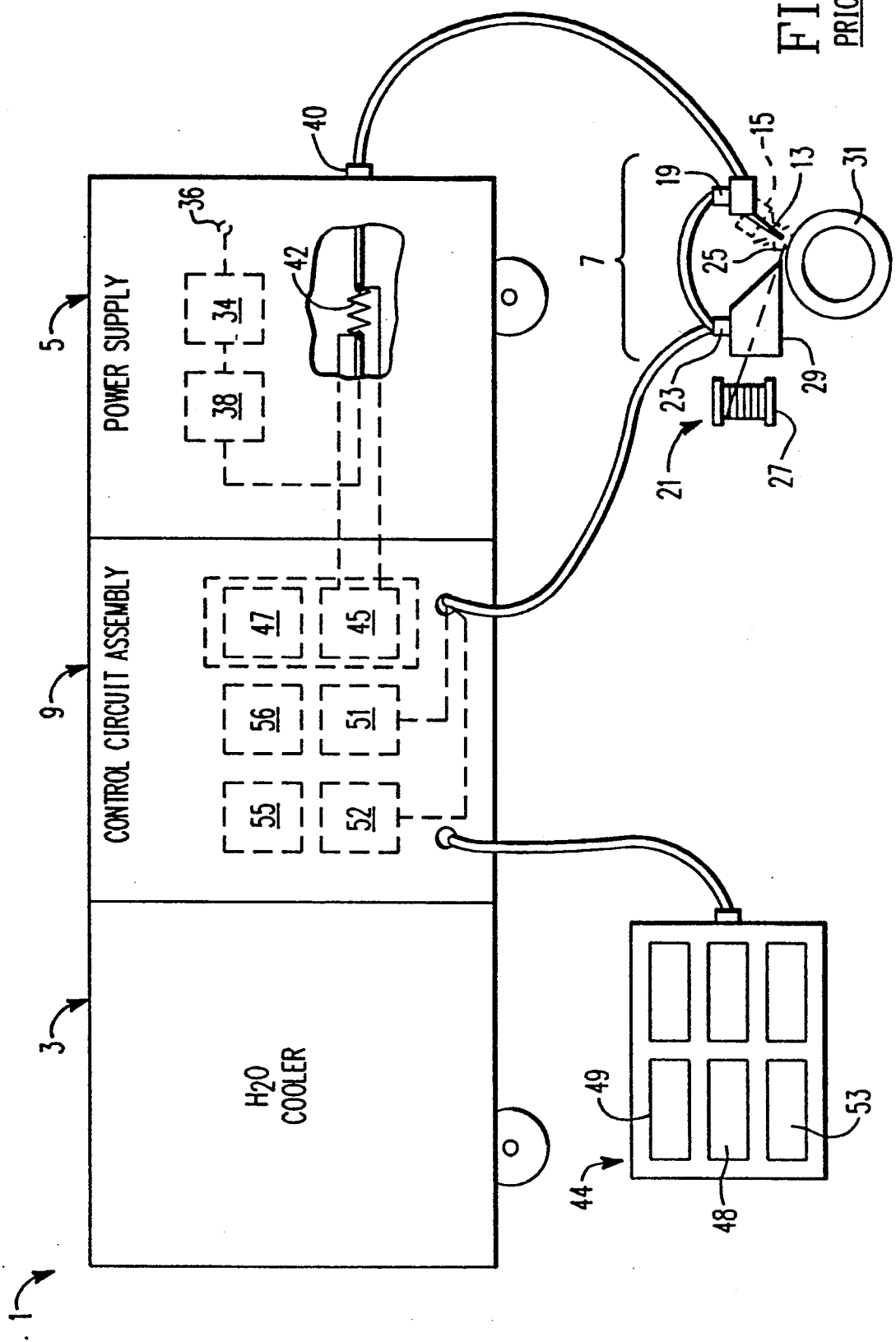
FIG. 1 is a schematic diagram of a conventional AGTAW welder, illustrating those components which will be replaced or modified in order to convert the AGTAW welder into a AGMAW welder.

FIG. 1 illustrates a prior art AGTAW welder 1 which may be converted into a AGMAW welder by the system and method of the invention. Such welders 1 typically include a water cooler assembly 3 for preventing the weldhead of the welder 1 from overheating by circulating water through it, a power supply 5 for supplying electrical current to a TIG weldhead 7, and a constant current control circuit assembly 9 for controlling the electrical characteristics of the power generated by the power supply 5.

The TIG weldhead 7 includes a tungsten electrode 13 surrounded by a gas shield 15 (shown in phantom). A source of inert, pressurized gas (not shown) is fluidly connected to the gas shield 15 for constantly displacing ambient atmospheric oxygen away from the molten puddles created at the distal tip of the tungsten electrode 13 in order to minimize oxidation and corrosion in the resulting weld. The weldhead 7 further includes an electrode extender and retractor motor 19 for maintaining the distal tip of the tungsten electrode at constant distance away from the workpiece so that the voltage used to drive the welding current remains substantially constant. Disposed opposite from the electrode extender and retractor motor 19 is the wire feeder assembly 21, whose purpose is to feed weld wire between the distal end of the tungsten electrode 13 and the molten puddle being created on the workpiece during a welding operation. To this end, the wire feeder assembly 21 includes a wire feeder motor 23 for feeding weld wire 25 from a spool 27 through a wire guide 29. As is schematically illustrated in FIG. 1, the wire guide 29 feeds the weld wire 25 at a proper orientation between the distal end of the tungsten electrode 13, and a workpiece 31.

The power supply 5 of a prior art AGTAW welder generally comprises a transformer assembly 34 connected to a power source 36. The transformer assembly 34 converts alternating current from the power source 36 into direct current, and feeds this direct current into a switching circuit assembly 38. As will be described in more detail hereinafter, the switching circuit assembly 38 comprises a plurality of switching circuits for adjusting both the current level and frequency of the output of the transformer assembly 34. The switching circuit assembly 38 is connected to an output connector 40 through a shunt resistor 42 whose purpose is explained hereinafter.

The control circuit assembly 9 includes a programmer 44 which has a plurality of thumb-wheel switches (not shown) in combination with a plurality of voltage divider networks for providing control signals to the various circuits of the assembly 9. The control circuit assembly 9 includes both circuits which adjust the electrical characteristics of the current flowing out of the power supply 5, as well as circuits which control the various servo-motors of the welder 1 (such as the previously-mentioned electrode retraction and extension motor 19 and the wire feeder motor 23). Circuits in the first category include an ammeter 45, a current pulser circuit 47, a current selector switch 48 having a readout scale, and a downslope circuit 49. The ammeter 45 is connected across the previously mentioned shunt resistor 42 to monitor the amount of current actually produced by the power supply 5. The shunt resistor 42 is characterized by a low resistance so it does not interfere significantly with the output of the power supply 5, and is further precision calibrated (at a rate of, for example, 1 millivolt per amp) to provide an accurate input for the ammeter 45. While not shown in detail, the ammeter 45 provides a positive feedback loop to the switching circuit assembly 38 of the power supply 5 to maintain the current output of the supply 5 at a desired level. A readout scale 46 is connected to the ammeter 45 to display the actual output current of the power supply 5. The current pulser circuit 47 of the control circuit assembly 9 controls the frequency of the output current in switching between a "background" current to a primary current. The use of two different current levels is a common operation in AGTAW welders, since the continuous use of a relatively high amperage current would, in many instances, maintain the weld puddle in a undesirably liquid state which could cause the weld metal to undesirably flow and drip out of the sides of the weld. Alternating the current level between the relatively high amperage necessary to create the weld, and a lower amperage which is sufficient to maintain the arc solves the aforementioned problem by creating a weld with molten metal which is maintained in a plastic but not liquid state. The current pulser circuit 47 controls the rate at which the current output alternates between a primary and background amperage, and is typically adjustable anywhere from between 0 to 9.9 cycles per second. The current selector switch 48 allows the system operator to select specific operating background and working currents for a particular job. The downslope circuit 49 ramps down the current at the termination of a welding operation to reduce the amount of thermal shock the weld puddle experiences when a welding heat is no longer applied to it. While the linear rate of the downsloping is variable, this circuit 49 typically operates to reduce the current level to 0 in about 4 seconds.

The control circuit assembly 9 further includes a wire feeder motor control circuit 51 which regulates the voltage of the current being supplied to the wire feeder motor 23. Such circuits 51 typically operate their respective motors at a rate such that the motors supply weld wire to the tungsten electrode 13 at a rate of up to 100 inches per minute. The electrode extender and retractor motor control circuit 52 operates its respective motor 19 to extend or retract the distal end of the tungsten electrode 13 such that the voltage of the arc between the electrode 13 and the workpiece 31 remains substantially constant. This circuit comes more into play when the contour of the workpiece 31 causes the distance between the distal end of the electrode 13 and the molten puddle to vary as the weldhead 7 is moved over the workpiece, such as when the weld site on the workpiece 31 is located in a recess on the surface of the piece. Finally, the arc voltage control circuit 53 is located in the programmer 44 and is ultimately connected to the electrode extender and retractor motor control circuit 52. This circuit 53 provides signals to the motor control circuit 52 indicative of what arc voltage the electrode extender and retractor motor control circuit 52 is to maintain. There are other servo-control circuits 55 and 56 contained within the control circuit assembly; however, because they are not pertinent to the conversion system and method of the invention, they will not be discussed in detail.

Figure 2A:
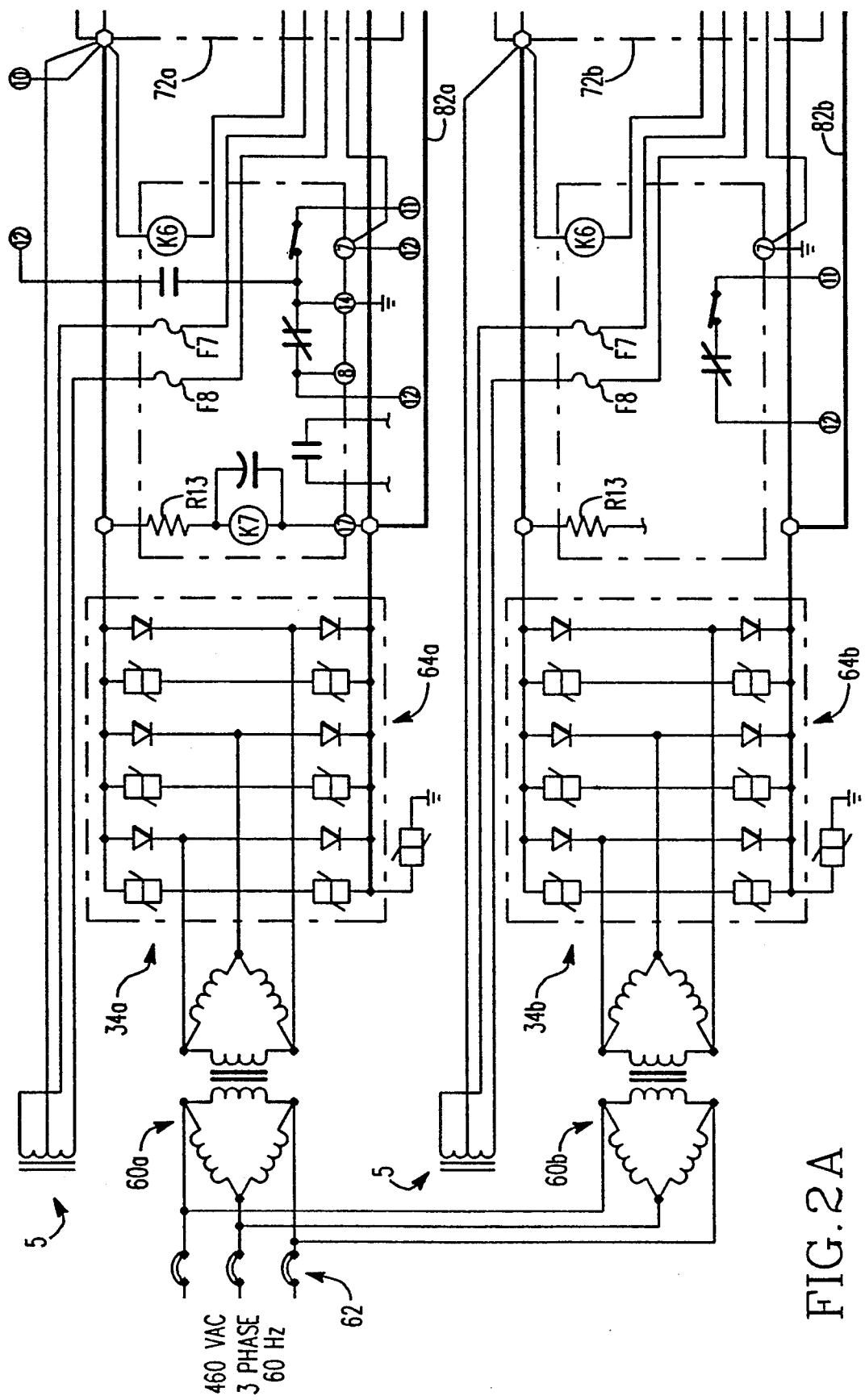
FIGS. 2A and 2B are a schematic diagram illustrating how the power supplies of two different AGTAW welders are connected in parallel in order to form a single, high amperage power supply suitable for AGMAW welding operations.
Figure 2B:
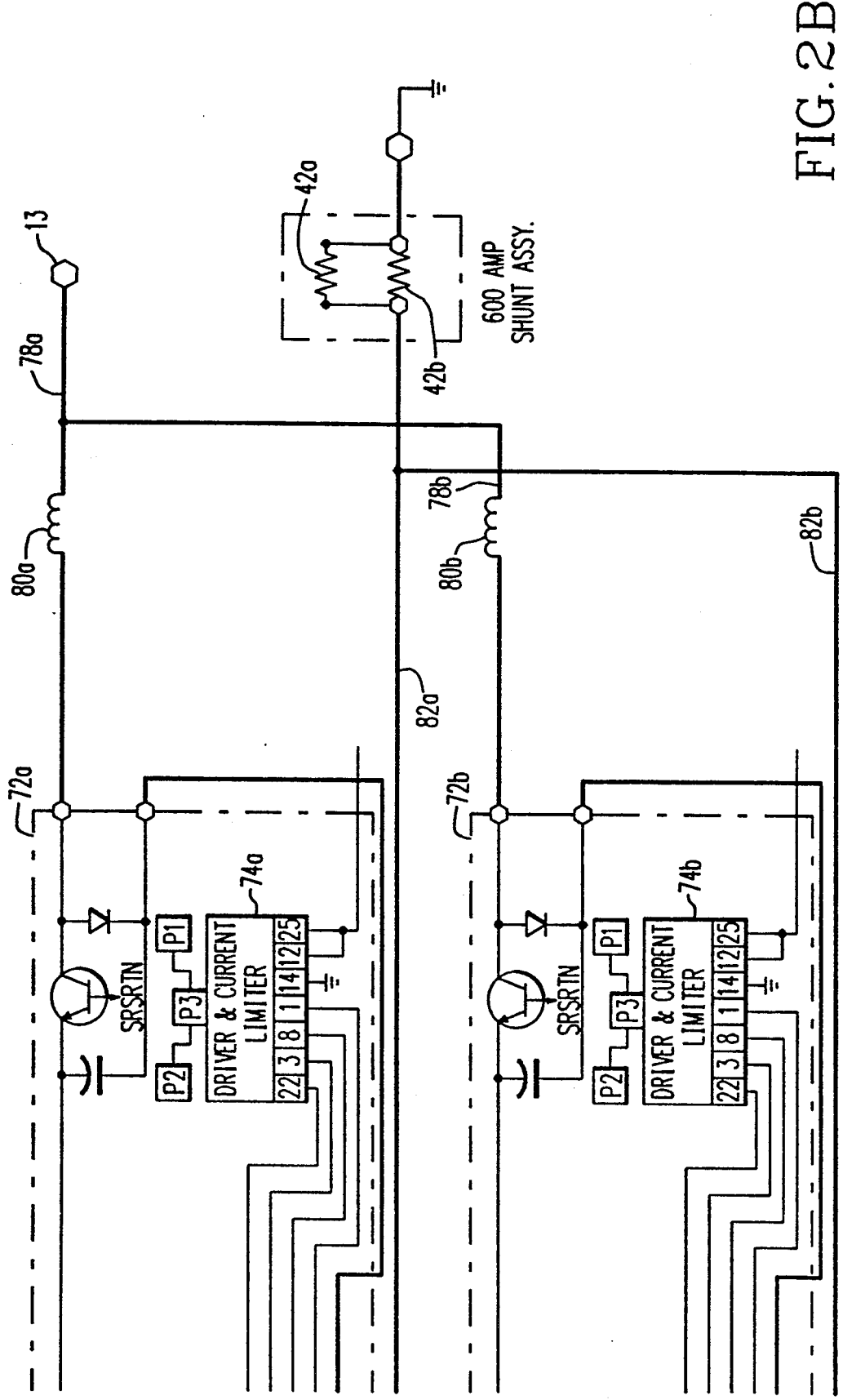

FIGS. 2A and 2B illustrate how two of the power supplies 5 of the AGTAW welder of FIG. 1 may be connected in parallel to create a single, large power supply having double the power capacity of the supply 5 of a single AGTAW welder. Each of the power supplies 5 includes a delta wound transformer 60a,b with multiple secondaries at its input end for converting the voltage of the 460 volt ac, three-phase current into 110 volt current. The 460 volt ac power source is connected to each of the transformers 60a,b in parallel as shown. A circuit breaker 62 is provided between the 460 volt ac power source and the transformers 60a,b as a safety factor. Each of the transformers 60a,b is connected to a three-phase, full bridge rectifier 64a,b for converting the 110 volt ac into direct current. The output of the rectifiers 64 a,b is connected across a network of transistors switching circuits 72a,b. The actuation of these transistor switching circuits 72a,b is controlled by means of a driver and current limiter 74a,b, respectively. Thus the drive and current limiter 74a,b of each of the power supplies 5 regulates the voltage and amperage characteristics of the electric current flowing out of its respective negative and positive output cables 78a,b and 82a,b. A ramping inductor 80a is included in each of the negative output cables 78a,b to gently ramp up the output current at start-up. The outputs of both the positive output cables 82a,b of the two power supplies 5 are connected to the input of the parallely connected shunt resistors 42a,b of the two power supplies as shown. Because the outputs of each of the two power supplies 5 is exactly the same (i.e., preferably 300 amps) and because the shunt resistors 42a,b each have the same calibration characteristics (i.e. 1 millivolt per amp), the parallel-connection of the two shunt resistors 42a,b has the effect of reducing the readout of the ammeter 45 by exactly 50 percent. Hence, if the ammeter 45 should display a reading of 300 amps output, the true output would be 600 amps. Of course, in lieu of connecting the shunt resistors 42a,b in parallel, it would be possible to replace these resistors 42a,b with a single resistor having a resistance of only one half millivolt per every amp. In closing, it should be noted that the power supply of the system of the invention not only involves the parallel connection of the inputs and outputs of the power supply of two AGTAW welders, but further involves the reversal of the polarity of the output between the electrode and the workpiece. Specifically, in a AGTAW welder, the workpiece is positively charged while the electrode 13 is negatively charged in order to give greater stability to the arc generated by the electrode 13. However, in a AGMAW welding operation, the workpiece should be negatively charged and the electrode positively charged, as has been implemented in FIG. 2.

Figure 3:
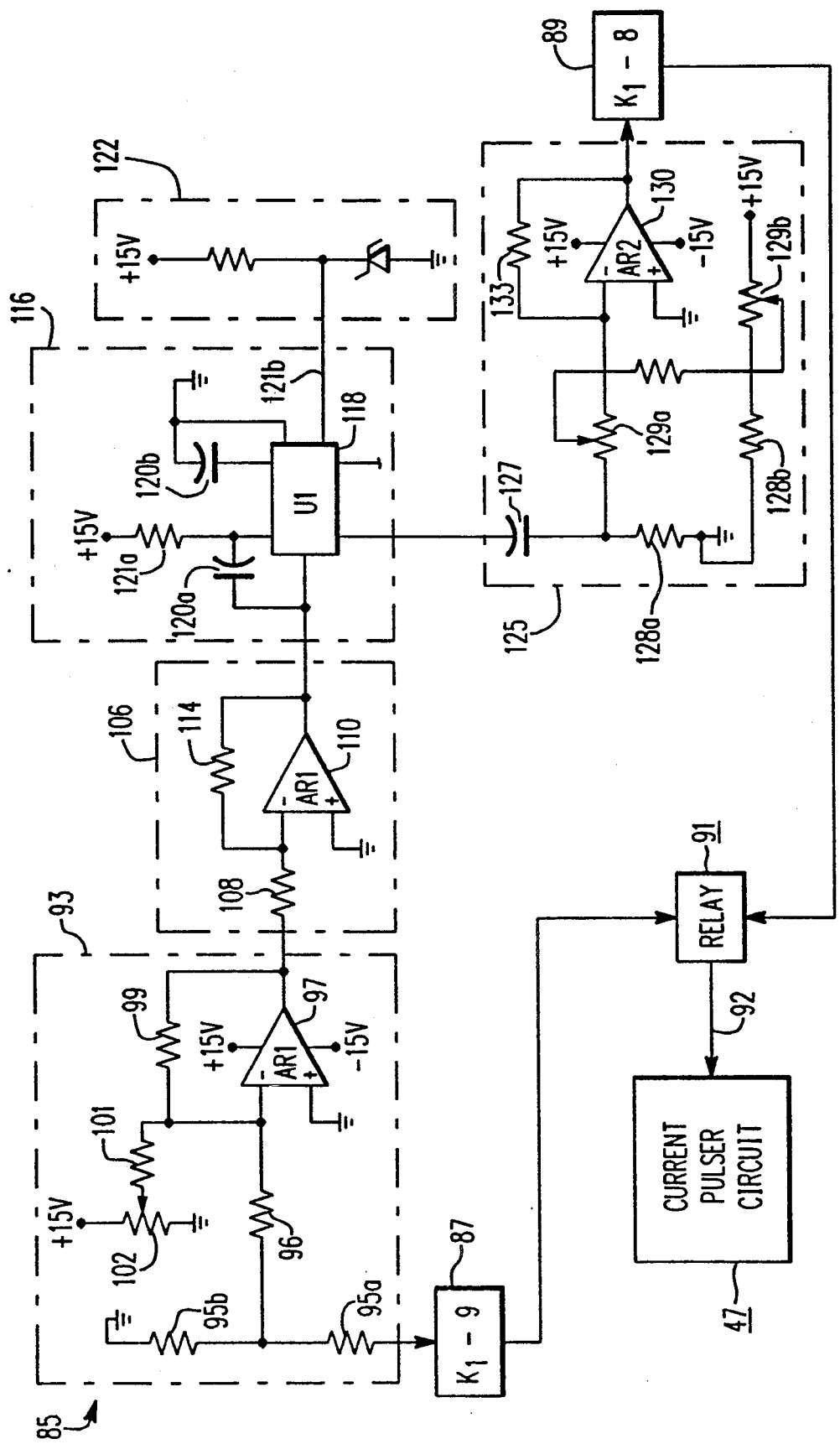
FIG. 3 is a schematic diagram of a pulser multiplier circuit which, when connected to the current pulser of a AGTAW welder, multiplies the frequency of the output by about 100 times.

FIG. 3 schematically illustrates the pulser multiplier circuit 85 of the system of the invention. This circuit 85 has both an input 87, and an output 89 which may be selectively connected to the current pulser circuit 47 that is normally present in the control circuit assembly 9 of a AGTAW welder 1 by means of a relay 91. The connection of the relay 91 to the input and output terminals 87,89 is preferably done by means of jacks or some other form of temporary connector so that the pulser multiplier circuit 85 can be easily removed from the control circuit assembly 9 when it is desired to return back to a AGTAW only capacity. In operation, when the relay 91 is an actuated state, the output 92 of the current pulser circuit 47 is directly connected to the input terminal 87 of the pulser multiplier circuit 85. However, when the relay 91 is in a deactuated state, the output 92 of the circuit 47 is connected directly to the output terminal 89, thereby completely bypassing the pulser multiplier circuit 85.

The pulser multiplier circuit 85 multiplies the number of pulses it receives from the current pulser circuit 47 by a factor of 100, thereby increasing the maximum frequency of the background-to-working current switching sequence from 9.9 cycles per second to 990 cycles per second, which is a frequency compatible with a high deposition, AGMAW-type welding process. To this end, the circuit 85 includes a scaling circuit 93 for scaling up the voltage amplitudes of the saw-tooth shaped wave signal it receives at terminal 87 from millivolts to volts, and inverter 106 for converting the saw-tooth wave form generated at the output of the scaling circuit 93 back into a shape consistent with the original wave form received at terminal 87, a pulser generator circuit 116 which multiplies every pulse received on the saw toothshaped wave generated by the inverter 106 into 100 square-shaped waves, a power supply 122 for providing a source of dc power to all of the circuits comprising the pulser multiplier circuit 85, and a pulse shaper 125 for converting the square wave pulses transmitted by the generator circuit 116 back into a saw-tooth wave form. The use of a saw-tooth wave form is preferred for controlling current pulses as such a wave form gradually increases the amplitude of the current, and then instantaneously cuts it off at the termination of each command pulse.

The input of the scaling circuit 93 includes a pair of voltage dividing resistors 95a,b which, in the preferred embodiment, have a resistance of 20 kilohms and 10 kilohms, respectively. The purpose of the voltage dividing resistors 95a,b is to provide a reference point to ground for the relatively low-voltage signal being generated by the current pulser circuit 47. The resulting, voltage-divided signal is next conducted through an input resistor 96 and from thence into one of the inputs of an operational amplifier 97. In the preferred embodiment, input resistor 96 has a value of approximately 100 kilohms to minimize the amount of current conducted to the operational amplifier 97. The operational amplifier 97 is preferably a model no. 1458 operational amplifier available from Allied Electronics located in Chicago, Ill. The other of the two inputs to the operational amplifier 97 is connected to ground, as shown, and the inputs to this amplifier 97 are connected to the 15 volt power source 122 in a manner well known in the art. A feedback resistor 99 is provided in the feedback loop from the output of the operational amplifier 97 to its signal-receiving input. In the preferred embodiment, the feedback resistor 99 has a value of 82 kilohms. Finally, a variable resistor 102, and a balancing resistor 101 are provided between the 15 volt potential provided by the power supply 122 and the upper input of the operational amplifier 97. The variable resistor 102 controls the amplitude of the resulting, scaled-up signal leaving the output of the operational amplifier 97. The resistance of the balancing resistor 102 is chosen to be the same as that of the input resistor 96, i.e., 100, kilohms.

While the scaling circuit 93 is capable of scaling up the amplitude of the saw-tooth wave form received at terminal 87 by approximately 3 orders of magnitude, the output of the operational amplifier 97 is unfortunately inverted relative to the original input signal receive at terminal 87. Accordingly, an inverter 106 is provided so that the shape of the scaled-up saw-tooth wave form which enters the pulse generator circuit 116 is the same shape as the saw-tooth wave form received at terminal 87. To this end, the inverter 106 includes an input resistor 108, another operational amplifier 110 which may be of the same model as that discussed with respect to the operational amplifier 87, and a feedback resistor 114 connected between the output of the amplifier 110, and its upper input. In the preferred embodiment, both the input resistor 108 and the feedback resistor 114 both have values of 10 kilohms.

The primary component of the pulse generator circuit 116 is timer 118. In the preferred embodiment, the timer 118 is a model no. 566CN digital timer available from Allied Electronics, located in Chicago, Ill. The timer 118 generates 100 pulses at its output for every one pulse it receives at its input from the inverter 106. The timer 118 includes two power input leads 121a,b for receiving the 15, volts dc from the power supply 122. A ground bypass capacitor is connected across the power input lead 121a and the input to the timer 118, and a second ground bypass capacitor 120b is connected in parallel with respect to the ground lead of the timer 118. The purpose of the ground bypass capacitors 120a,b is prevent the pulses generated by the timer 118 from creating harmonic currents which could flow back into the dc power supply 121 and interfere with its performance. In the preferred embodiment, ground bypass capacitor 120a has a capacity of 0.001 microfarads, while capacitor 120b has a capacity of 0.047 microfarads.

The pulser multiplier circuit 85 further includes a pulse shaper 125 for receiving the square wave pulses created by the timer 118, and converting them back into a saw-tooth wave form. To this end, the input of the pulser shaper 125 includes a smoothing capacitor 127 having a capacitance of 3.3 microfarads. The capacitor 127 decreases the slope of the near-vertical sides of the square wave received from the timer 118. The output from the smoothing capacitor 127 is serially connected to the 15 volt dc output of the power supply through fixed shaping resistors 128a,b, as well as through variable resistor 129b. In the preferred embodiment, the value of the fixed shaping resistors is 660 kilohms and one kilohm respectively, and the maximum value of the variable resistor 129b is 20 kilohms. The output of the smoothing capacitor 126 is further connected to the upper input of an operational amplifier 130 through a second variable resistor 129a as shown, which has a maximum resistance of 10 kilohms. Finally, the pulser shaper 125 includes a feedback resistor 133 having a resistance of 37.5 kilohms which is connected between the output of the operational amplifier 130, and its upper input. The amplitude and slope of the saw-tooth wave form produced by the pulse shaper 125 at the output terminal 89 may be controlled by adjusting the resistances of the variable resistors 129a,b.

Figure 4:
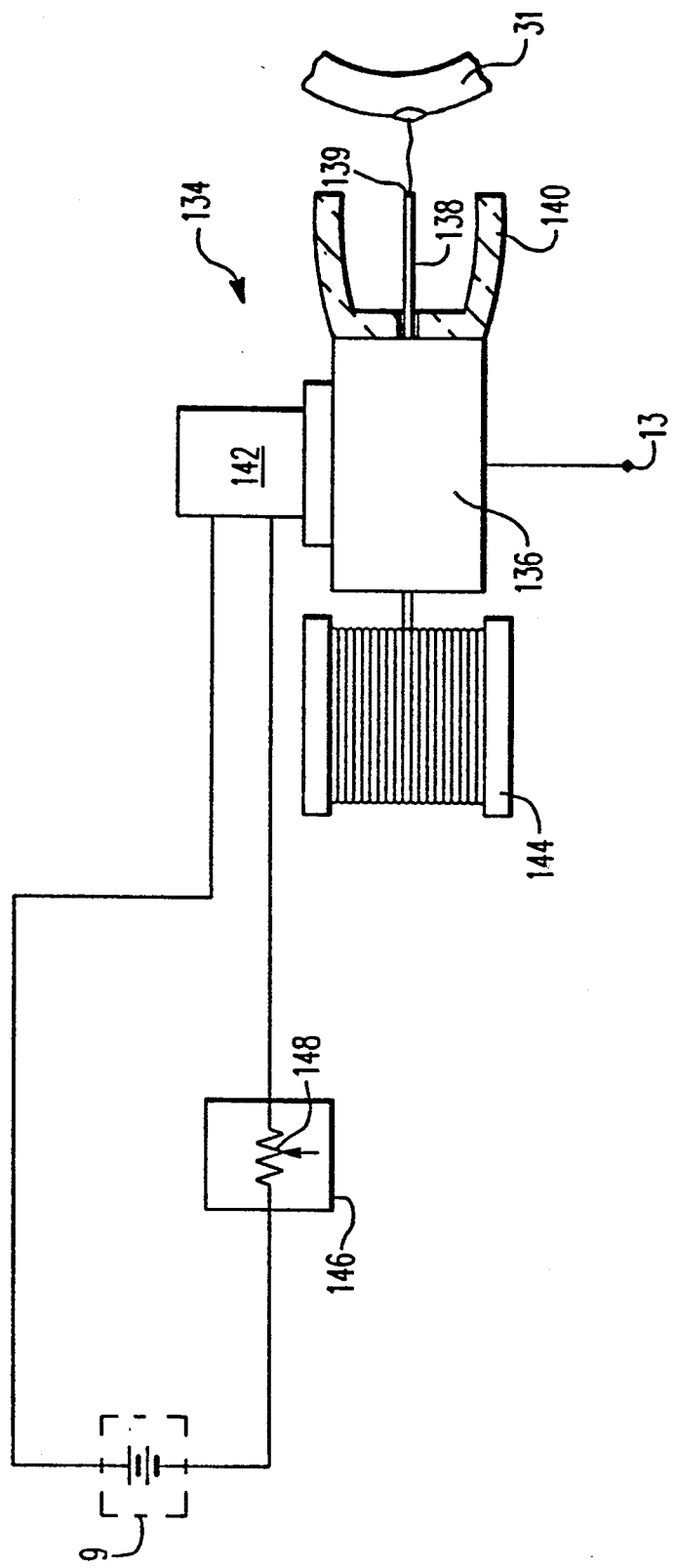
FIG. 4 schematically illustrates the replacement wire feed motor and motor control circuit used to increase the wire feed capacity of the AGTAW welder from 100 inches a minute to 1000 inches a minute.

FIG. 4 schematically illustrates the MIG weldhead assembly 134 of the system which is used to replace the previously mentioned TIG weldhead 7. The MIG weldhead assembly 134 generally comprises a wire guide 136 for directing a consistently moving strand of weld wire 138 through a ceramic gas shield 140 which is located adjacent to a workpiece 31. An electrical potential is imposed directly onto the weld wire 138 so that it acts as its own electrode, and generates an arc between it and the workpiece 31 as shown. This electrical arc fuses the weld wire 138 such that it continuously drops liquid metal into a weld puddle located on the surface of the workpiece 131. In order to keep both the voltage and the current at steady state, it is necessary to feed the weld wire 138 such that the distal end 139 is maintained at the same distance with respect to the workpiece 31. To this end, a wire feed motor 142 is provided. Because the MIG weldhead assembly 134 fuses weld wire at a much faster rate than a TIG weldhead 7, the wire feed motor 142 of the MIG weldhead assembly 134 must have a much greater speed if the distal end 139 of the wire 38 is to be maintained at a steady distance from the workpiece 31. To this end, a globe model M-80-M22 dc motor manufactured by Labinal Components and Systems, Inc., located in Dayton, Ohio may be used. The wire feed motor 142 reels the weld wire 138 off of a wire spool 144 as shown. To provide the variable voltage signals necessary to properly operate the AGMAW wire feed motor 142 at the necessary speeds of up to 1000 inches per minute, the system of the invention further includes a wire feeder motor control circuit 146 which replaces the TIG wire feed motor control circuit 51 present in the control circuit assembly 9. In the preferred embodiment, the AGMAW wire feeder control circuit 146 comprises a model LN-25 wire feeder board manufactured by Lincoln Electric located in Cleveland, Ohio. Basically, the wire feeder motor control circuit 146 of the system includes a variable resistor 148 capable of varying the voltage of the direct current received from the control circuit assembly 9 in order to vary the rpms of the wire feeder motor 142. Because the wire feeder motor control circuits 51 in most AGTAW welders 1 are modular circuits designed to be easily removed from the control circuit assembly 9, the substitution of the AGMAW wire feeder motor control circuit 146 with the AGTAW circuit 51 is a simple operation.

Figure 5:
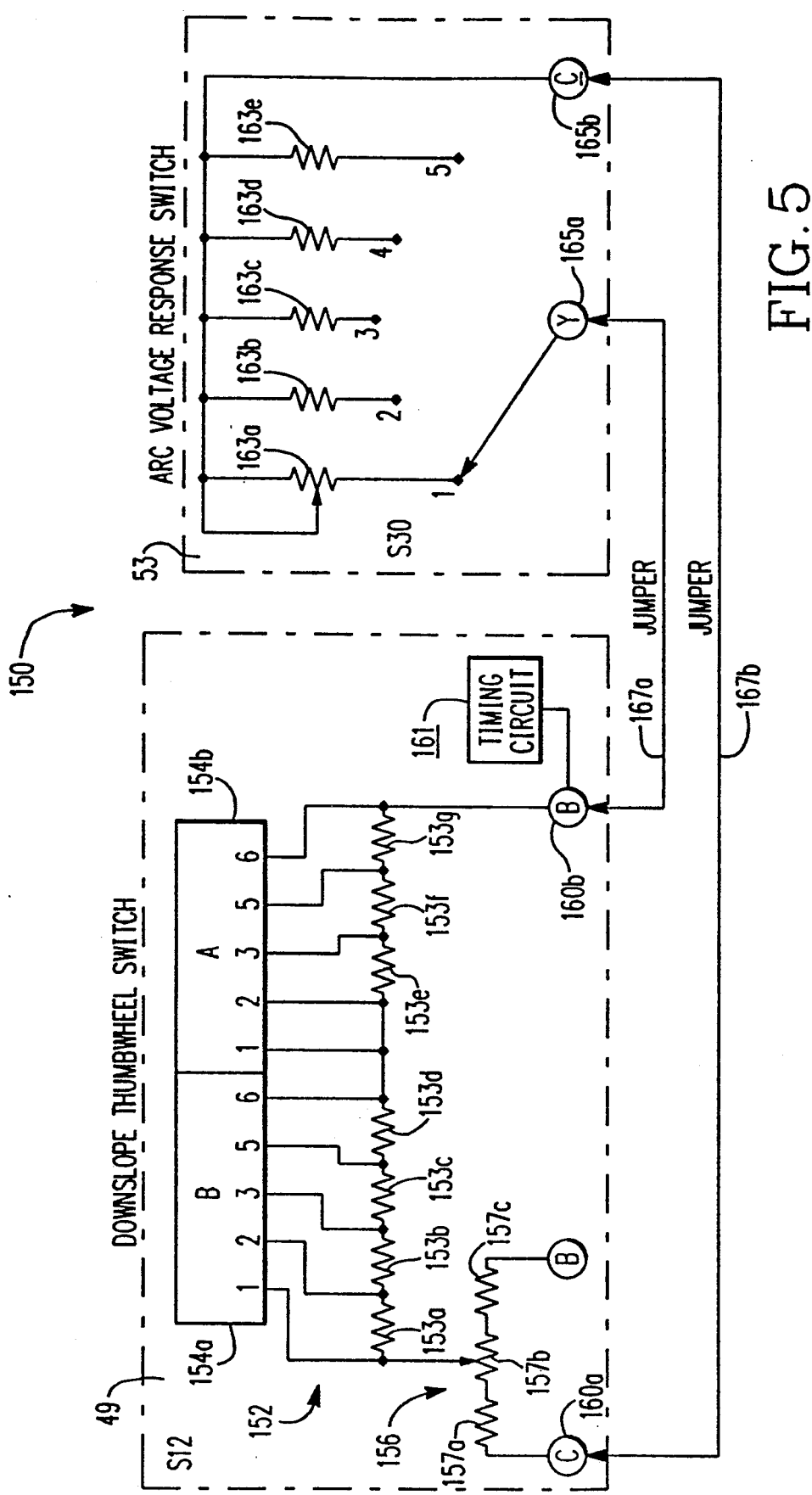
FIG. 5 illustrates how the downslope circuit in the programmer of the AGTAW welder may be modified by one of the resistors in the arc voltage control circuit in order to provide a burn-back circuit for AGMAW welding operations.

FIG. 5 illustrates the burnback circuit 150 of the system of the invention. The burnback circuit 150 functions to burn the distal end 139 of the weld wire 138 away from the weld puddle at the termination of a MIG welding operation so that the wire 138 is not "frozen" into this puddle at the termination of the welding operation. This burnback circuit 150 is formed by interconnecting the downslope circuit 49 with the arc voltage control circuit 53 in a manner to be described presently. Both of these circuits 49 and 53 are, of course, located in the programmer 44 of the control circuit assembly 9 of the AGTAW welder 1. The downslope circuit 49 generally comprises a voltage divider network 152 formed from a plurality of serially connected resistors 153a through 153g. These resistors are in turn connected in parallel through thumbwheel switches 154a,b such that any one or all or any combination of the resistors 153a through 153g can be interconnected. The resistances of the resistors 153a-g are typically on the order of 22.1 kilohms, 44.2 kilohms, 66.5 kilohms, 133 kilohms, 665 kilohms, 442 kilohms, and 221 kilohms respectively. An adjustment potentiometer 156 is connected to the output of the voltage divider network 152 formed from the resistors 153a-g. This adjustment potentiometer includes three, serially connected adjustment resistors 157a-c, whose resistances are typically 511 kilohms, 500 kilohms and 4.02 kilohms, respectively. The output terminals of the downslope circuit 49 include terminals 160a,b as shown, which are connected to a timing circuit 161 as shown. The timing circuit 161 generates a downslope time that is dependent upon the voltage of the control signal that enters it through the voltage divider network 152.

Turning now to a brief description of the arc voltage circuit 53, this circuit comprises a multiple position switch 162 for serially connecting one of five resistors 163a through 163e to the output of the circuit. The resistances of the resistors 163a-e are 100 kilohms, 58.1 kilohms, 49.9 kilohms, 19.6 kilohms and 40.2 kilohms, respectively, and terminals 165a,b form the output terminals of this circuit as indicated.

To form the burnback circuit 150 of the system of the invention, the output terminals 160a,b of the downslope circuit 49 are connected in parallel with the output terminals 165a,b of the arc voltage circuit 53 by means of jumper cables 167a,b. As a result of this interconnection, the current downslope is increased by a factor of approximately 200. Accordingly, the current is now terminated from its working level down to zero in about one two-hundredth of the time that an unmodified downslope circuit 49 in the program 44 of a typical AGTAW welder would implement, thus rendering the action of the downslope circuit 49 fast enough to terminate a AGMAW welding operation such that the distal end 139 of the weld wire 138 does not end up "frozen" in the weld puddle created on the workpiece 31.

The method of the invention may now be easily understood with reference to the components described with respect to the system of the invention. In the first step of the method of the invention, the TIG weldhead 7 of the welder 1 to be converted is replaced with the previously described MIG weldhead assembly 134. Concurrent in this step is the replacement of the AGTAW wire feeder motor 23 with a higher speed AGMAW wire feeder motor 142. Next, the wire feeder motor control circuit 51 of the control circuit assembly 9 of the AGTAW welder 1 is replaced with a commercially available, AGMAW wire feeder motor control circuit 146 as previously described. In the next step of the method of the invention, the pulser multiplier circuit 85 is installed within the control circuit assembly such that it can be selectively connected in parallel with the current pulser circuit 47 of the control circuit assembly 9 by means of relay 91. The power supply 5 of the AGTAW welder 1 may then be connected in parallel with another power supply as was described with reference to FIG. 2. At this juncture, the polarity of the output of the combined power supplies should be adjusted such that the wire being fed out of the AGMAW weldhead 134 is positive, while the workpiece 31 is negatively charged. Finally, the burnback circuit 150 of the converted welder is formed by connecting jumper cables 167a,b across the outputs of the downslope circuit 49 and arc voltage control circuit 53 in the manner previously described to multiply the slope of the resulting downslope by a factor of approximately 200.

We claim:

1. A system for converting a AGTAW welder into a AGMAW welder, said AGTAW welder being of the type that includes a power supply having an output, a TIG weldhead connected to the output of the power supply, and a constant current type control circuit assembly having a current pulser for pulsing the power supply output current at a frequency of up to 9.9 times per second, comprising:
   a MIG weldhead connected to the output of the AGTAW welder power supply for replacing said TIG weldhead,
   a pulser multiplier circuit connected to said current pulser for increasing the frequency of the power supply output current to a rate compatible with an AGMAW welding operation,
   a wire feed means connected to the AGTAW control circuit assembly for feeding wire through said MIG weldhead during a AGMAW welding operation at a AGMAW welding rate, and
   a burnback circuit connected to the AGTAW control circuit assembly for burning said wire back from a weld puddle at the termination of said AGMAW welding operation.

2. A system as defined in claim 1, wherein said pulser multiplier circuit includes a switching means for selectively connecting the output of the current pulser to the input of the pulser multiplier circuit.

3. A system as defined in claim 1, further comprising a second power supply, and means for connecting the output of said second power supply to the output of said first power supply in parallel.

4. A system as defined in claim 3, wherein the outputs of said first and second power supplies each include a shunt resistance, and said control circuit assembly includes a programmer having a current selector switch with a readout scale, and a current sensor connected across the shunt resistance of said first power supply for monitoring current output, and further comprising means for electrically connecting the shunt resistances of both said first and second power supplies together such that said current sensor senses the combined current output of both power supplies.

5. A system as defined in claim 4, wherein said shunt resistances are electrically connected in parallel such that the readout scale of the current selector switch is reduced.

6. A system as defined in claim 5, wherein the shunt resistances of both the first and second power supplies are equal, such that the readout scale of the current selector switch is halved.

7. A system as defined in claim 1, wherein said programmer includes a downslope circuit for linearly reducing the current to the weldhead during a AGTAW welding operation, and said burnback circuit comprises said downslope circuit, and a downslope accelerator circuit selectively connectable to said downslope circuit for decreasing the downslope time by at least an order of magnitude.

8. A system as defined in claim 7, wherein said downslope circuit includes a timing circuit for generating control pulses whose frequency determines the downslope time, and wherein the frequency of said control pulses is dependent upon an input voltage to said timing circuit, and wherein said downslope accelerator circuit includes a resistor means for modifying said input voltage.

9. A system as defined in claim 8, wherein said programmer further includes an arc voltage response circuit having at least one resistor, and wherein the resistor means of said downslope circuit is the resistor of said arc voltage response circuit.

10. A system for converting first and second AGTAW welders into an AGMAW welder, wherein each of said AGTAW welders is of the type that includes a power supply, a TIG weldhead connected to the output of the power supply, and a constant current type control circuit assembly including a programmer and having a current pulser for pulsing the power supply output current at a frequence of up to 9.9 times per second, comprising:
   means for selectively connecting the outputs of the power supplies of said first and second AGTAW welders in parallel, wherein the combined output of said power supplies is sufficient to conduct an AGMAW welding operation;
   means for selectively connecting the control circuit assembly of said first AGTAW welder in parallel with the power supply of said second AGTAW welder such that said control circuit assembly of said first AGTAW welder controls the output of the power supplies of both of said AGTAW welders;
   a MIG weldhead connected to the combined output of the power supplies of said first and second AGTAW welders for replacing the TIG weldhead of said first AGTAW welder, and
   a pulser multiplier circuit connected to to the current pulser of the control circuit assembly of said first AGTAW welder for increasing the frequency of the power supply output to at least 200 pulses per second.

11. A system as defined in claim 10, wherein the outputs of said first and second power supplies each include a shunt resistance, and said control circuit assembly includes a programmer having a current selector switch having a readout scale, and a current sensor connected across the shunt resistance of said first power supply for monitoring current output, and further comprising means for electrically connecting the shunt resistances of both said first and second power supplies together such that said current sensor senses the combined current output of both power supplies.

12. A system as defined in claim 11, wherein the shunt resistances of both power supplies are equal, and wherein said shunt resistances are electrically connected in parallel so that the readout scale of the current selector is halved.

13. A system as defined in claim 10, wherein said MIG weldhead includes a wire feed means, and said conversion system further includes a circuit means selectively connectable to said wire feed means for increasing the wire feed rate to an extent compatible with an AGTAW welding operation.

14. A system as defined in claim 13, wherein the MIG weldhead of said conversion system further comprises a motor for feeding wire at a maximum rate of about 1000 inches per minute.

15. A system as defined in claim 10, further comprising a burnback circuit selectively connectable to said control circuit assembly for burning weld wire back from a weld puddle at the termination of said AGMAW welding operation.

16. A system as defined in claim 15, wherein said programmer includes a downslope circuit for linearly reducing the current to the weldhead during a AGTAW welding operation, and said burnback circuit comprises said downslope circuit and a downslope accelerator circuit for decreasing the burnback time by at least an order of magnitude.

17. A system as defined in claim 16, wherein said downslope circuit includes a timing circuit for generating control pulses whose frequency determines the downslope time, and wherein the frequency of said control pulses is dependent upon an input voltage to said timing circuit, and wherein said downslope accelerator circuit includes a resistor means for modifying said input voltage.

18. A system as defined in claim 17, wherein said programmer further includes an arc voltage response circuit having at least one resistor, and wherein the resistor means of said downslope accelerator circuit is a resistor of said arc voltage response circuit.

19. A system as defined in claim 10, wherein pulser multiplier circuit increases the frequency of the power supply output current to at least 500 pulses per second.

20. A method for converting first and second AGTAW welders into an AGMAW welder, wherein each of said AGTAW welders is of the type that includes a power supply having an output, a TIG weldhead connected to the output of the power supply, and a constant current type control circuit assembly having a programmer for pulsing the power supply output current at a selected frequency, comprising the steps of:
    replacing the weldhead of the first AGTAW welder with a MIG weldhead;
    connecting the output of the power supplies of said first and second AGTAW welders in parallel;
    connecting the control circuit assembly of said first AGTAW welder to the power supply of the second AGTAW welder such that said control assembly controls the power supplies of both of said welders; and
    connecting a pulser multiplier circuit to the current pulser of the control circuit assembly of said first AGTAW welder to increase the frequency of the combined outputs of said power supplies.

21. A method as defined in claim 20, wherein the outputs of both of said power supplies each include a shunt resistance across which an ammeter is connected to monitor the amperage of the output current, and wherein said step of connecting the control circuit assembly includes disconnecting the ammeter of said second AGTAW welder from its respective shunt resistance, and connecting the shunt resistances of both said first and second AGTAW welders in parallel such that the ammeter of the first AGTAW welder is connected in parallel across both said resistances.

22. A method as defined in claim 22, wherein said first AGTAW welder is of the type which further includes a motor for feeding wire through a TIG weldhead that is connected to a motor control circuit, and further comprising the step of replacing said motor and motor control circuit with a motor and motor control circuit capable of feeding wire through said MIG weldhead at a rate compatible with an AGMAW welding operation.

23. A method as defined in claim 20, further comprising the step of providing the control circuit assembly with a burnback circuit for burning wire back from a weld puddle at the termination of an AGMAW welding operation.

24. A method as defined in claim 23, wherein said programmer is of the type including a downslope circuit for linearly reducing the current to the weldhead during an AGTAW welding operation, and arc voltage response circuit including a plurality of resistors, and said burnback circuit is provided by connecting one of said resistors of said arc voltage response circuit to an input of said downslope circuit to decrease the downslope time to a level compatible with an AGMAW burnback time.

25. A method as defined in claim 20, further comprising the step of reversing the polarity of the combined outputs of the power supplies of said first and second AGTAW welders.

* * * * *